(12) United States Patent
Battlogg (10) Patent No.: US 11,959,778 B2
(45) Date of Patent: Apr. 16, 2024

(54) DEVICE WITH AT LEAST ONE SENSOR FOR ACQUIRING MEASUREMENT DATA VIA A RELATIVE MOVEMENT AND A SCALE DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 156 days.

(21) Appl. No.: 17/531,893

(22) Filed: Nov. 22, 2021

(65) Prior Publication Data

US 2022/0163351 A1 May 26, 2022

(30) Foreign Application Priority Data

Nov. 24, 2020 (DE) ...................... 10 2020 131 114.1
Dec. 23, 2020 (DE) ...................... 10 2020 134 860.6

(51) Int. Cl.
*G01D 5/14* (2006.01)

(52) U.S. Cl.
CPC .................................. *G01D 5/145* (2013.01)

(58) Field of Classification Search
CPC ............ G01D 5/12; G01D 5/14; G01D 5/142; G01D 5/145; G01D 5/244; G01D 5/245; G01D 5/246; G01D 5/2451; G01D 5/252; G01D 2205/10; G01D 2205/18; F16F 9/3292; F16F 9/537
See application file for complete search history.

(56) References Cited

U.S. PATENT DOCUMENTS

| | | | |
|---|---|---|---|
| 5,568,760 A | 10/1996 | Volzer | |
| 2002/0190710 A1* | 12/2002 | Steinich | G01D 5/2457 324/207.25 |
| 2004/0222788 A1* | 11/2004 | Low | F16F 9/3221 341/15 |
| 2005/0120795 A1* | 6/2005 | Nehl | B60G 17/01933 73/514.39 |

(Continued)

FOREIGN PATENT DOCUMENTS

| | | |
|---|---|---|
| DE | 2933557 A1 | 2/1981 |
| DE | 9412435 U1 | 9/1994 |

(Continued)

*Primary Examiner* — Huy Q Phan
*Assistant Examiner* — David B Frederiksen
(74) *Attorney, Agent, or Firm* — Laurence A. Greenberg; Werner H. Stemer; Ralph E. Locher (57) ABSTRACT

A device has a sensor unit for detecting measurement data about a relative movement of two components that are moved relative to one another. The sensor unit includes a scale unit connected to one of the components and extending in a movement direction of the relative movement over a measuring section. The scale unit includes a structure having magnetic bodies repeating in a defined manner along the measuring section. The magnetic bodies are axially magnetized and are arrayed having identical magnetic poles along the measuring section and/or the magnetic bodies are radially magnetized and are arrayed in alternation with respect to their magnetic poles along the measuring section. The sensor unit includes a pre-tensioning unit which fixes the arrayed magnetic bodies using a pre-tensioning force.

23 Claims, 5 Drawing Sheets

(56) References Cited

U.S. PATENT DOCUMENTS

| | | | |
|---|---|---|---|
| 2006/0208724 A1* | 9/2006 | Reichert | F15B 15/2861 324/207.2 |
| 2009/0284252 A1* | 11/2009 | Burgdorf | G01D 5/2451 324/207.2 |
| 2009/0294231 A1* | 12/2009 | Carlson | F16F 9/535 188/267.2 |
| 2010/0156400 A1* | 6/2010 | Noguchi | G01D 5/145 324/207.25 |
| 2011/0083929 A1* | 4/2011 | Marking | F16F 9/53 188/267.2 |
| 2011/0084503 A1* | 4/2011 | Li | B60G 17/019 290/1 R |
| 2014/0288776 A1* | 9/2014 | Anderson | B60G 13/14 701/37 |
| 2015/0167769 A1* | 6/2015 | Lee | F16F 15/035 188/267 |
| 2016/0339988 A1 | 11/2016 | Mayer et al. | |
| 2017/0294828 A1* | 10/2017 | Chen | H02K 49/043 |
| 2017/0307416 A1* | 10/2017 | Tsukamoto | G01D 5/2452 |

FOREIGN PATENT DOCUMENTS

| | | |
|---|---|---|
| DE | 102006057362 A1 | 6/2008 |
| DE | 102012208589 A1 | 11/2013 |
| DE | 102012012532 A1 | 1/2014 |
| DE | 102015107707 A1 | 11/2016 |

* cited by examiner

DEVICE WITH AT LEAST ONE SENSOR FOR ACQUIRING MEASUREMENT DATA VIA A RELATIVE MOVEMENT AND A SCALE DEVICE

SPECIFICATION

Field and Background of the Invention

The present invention relates to a device having at least one sensor unit for detecting measurement data about a relative movement of two components moved relative to one another. The sensor unit comprises at least one scale unit connectable to one of the components. The scale unit extends in a movement direction of the relative movement over at least one measuring section. The invention also relates to a scale unit for such a device.

Such a detection of measurement data about the relative movement of two components is often used to be able to deliberately control a movement of the components and often also further functions of the device. For example, the relative movement is detected using the sensor unit in dampers or in other machine parts or vehicle components moving relative to one another, for example, chassis components or drive or transmission components.

To enable the most optimum possible damping, a targeted setting of the damping properties is generally indispensable. For this purpose, among other things electrically controllable dampers are used, in which electrical switching over of the damper properties takes place.

For example, such dampers can be used in single-track and in multitrack (thus also two-track) vehicles and also in bicycles. The dampers are often designed there as chassis dampers and, for example, as shock absorbers or steering dampers. The dampers enable improved ground contact or better steering behavior, respectively, and thus permit safe and sporty driving even in extreme driving situations and terrains. However, such dampers are also used in other areas.

For example, a damper is known from DE 10 2012 012 532 A1 of the applicant, in which the damper unit comprises a controllable damping valve having a field generating unit, using which a field-sensitive medium such as a magnetorheological fluid can be influenced to influence the damping force of the damper unit by applying a field strength of the field generating unit. In this known damper, the damping force of the damper unit is set in real time. For this purpose, events in the form of shocks are detected and a relative velocity of the damper ends is periodically ascertained. For the damping, a characteristic value is derived from the relative velocity and a field strength to be set is in turn derived from a damper characteristic curve using the characteristic value. The field strength to be set is generated in real time using the field generating unit in order to set the damping force in real time. It is possible to react flexibly to all types of shocks using this known damper, since the damper is set directly matching after the recognition of a relative movement.

For such a deliberate and rapid control, however, a sensor system having particularly high resolution and also operating particularly quickly is required. Thus, a chassis controller having a shock absorber of the type in question is known from DE 10 2015 107 707 A1 of the applicant. The sensor system disclosed therein is equipped with a scale unit, which has a structure having periodically repeating magnetic properties over the measuring section. This sensor system supplies very satisfactory results. Nonetheless, it is desirable to further improve the sensor system disclosed therein.

SUMMARY OF THE INVENTION

It is therefore the object of the present invention to improve the sensor system for relative movements of components and in particular of controllable dampers. In particular, the solution is to offer a precise and rapid sensor system which at the same time is implementable with a simple design and cost-effectively. A detection of measurement data is preferably also to be possible reliably under difficult usage conditions. An advantageous use or integration in motor vehicles is particularly preferably to be possible.

This object is achieved by a device having the features as claimed. Preferred refinements of the invention are the subject matter of the dependent claims. Further advantages and features of the present invention result from the general description and the description of the exemplary embodiments.

The device according to the invention comprises at least one sensor unit for detecting measurement data at least about a relative movement of at least two components moved or movable relative to one another. The sensor unit comprises at least one scale unit connectable or connected to one of the components. The sensor unit extends in a movement direction of the relative movement over at least one measuring section. The scale unit has at least one structure having magnetic bodies repeating in a defined (and in particular periodical) manner at least along the measuring section. In particular, the scale unit is provided by the magnetic bodies arranged in this way. The magnetic bodies are axially magnetized and are arrayed having identical magnetic poles along the measuring section, so that adjacent magnetic bodies repel one another (repelling arrangement) and/or the magnetic bodies are radially magnetized and are arrayed alternating along the measuring section with respect to their magnetic poles, in particular so that adjacent magnetic bodies attract one another at least with respect to their arrangement (attracting arrangement). In particular, the sensor unit comprises at least one pre-tensioning unit. In particular, the pre-tensioning unit fixes the arrayed magnetic bodies using a pre-tensioning force.

The sensor unit in particular comprises at least one receptacle unit for receiving the structure, in particular having its magnetic bodies repeating in a defined manner. The receptacle unit is preferably suitable and designed to receive the magnetic bodies (arranged in a defined manner) and in particular to fix them in their defined arrangement and in particular to fasten them.

The receptacle unit comprises in particular at least one receptacle space and preferably at least one cavity for receiving the magnetic bodies. In particular, the receptacle unit is designed to be tubular. The receptacle unit can comprise at least one tube or can be formed as such. The magnetic bodies are in particular arranged at least partially inside the receptacle unit here and preferably are enclosed at least partially radially and preferably radially in their entirety by the receptacle unit.

It is possible that the device comprises at least one (in particular both) of the at least two components movable relative to one another and preferably at least the component connectable to the scale unit. The component connectable to the scale unit can preferably at least partially provide the receptacle unit. The receptacle unit can be formed separately from the component. The receptacle unit can also be integrally connected to the component or permanently integrated in the component. The component connectable to the scale unit in particular comprises at least one piston rod or is formed as such.

In particular, the component connectable to the scale unit, preferably the piston rod, is part of a damper and/or part of a measuring unit, as described hereinafter. The components movable relative to one another can be designed as attachment units of the damper and/or as measuring elements of the measuring unit.

In all embodiments, it is preferred and advantageous that the device comprises at least one controllable damper having at least two attachment units movable relative to one another. The attachment units are operationally connected (to one another) via at least one damper unit for damping shocks. The sensor unit is designed in particular for detecting measurement data at least about a relative movement of the attachment units in relation to one another. The scale unit is preferably connected to one of the attachment units of the damper for this purpose. In particular, in such an embodiment the components are provided by the attachment units or comprise such attachment units. Preferably, one of the attachment units, in particular the attachment unit connected to the scale unit, at least partially provides the receptacle unit and preferably the piston rod or is formed as such. In particular, the magnetic bodies are at least partially arranged inside the attachment unit connected to the scale unit.

In all embodiments, it is also preferred and advantageous that the device comprises at least one measuring unit. The measuring unit comprises in particular at least two measuring elements that are movable (relative to one another). The scale unit is preferably connected to one of the measuring elements for this purpose. In particular, in such an embodiment the components are provided by the measuring elements or comprise such measuring elements. One of the measuring elements, in particular the measuring element connected to the scale unit, preferably at least partially provides the receptacle unit, preferably the piston rod, or is formed as such. The other measuring element is then formed, for example, as a cylinder, in which the piston rod can retract or extend. The measuring elements are in particular passively movable. For example, the measuring elements are moved by the components coupled thereon to detect measurement data about their relative movement. A transmission unit can be provided for this purpose to convert the movement of the components into a linear movement for the measuring unit. In all embodiments, it is preferred that the magnetic bodies are at least partially arranged inside the measuring element connected to the scale unit.

However, the measuring elements can also be at least partially actively movable relative to one another. The measuring elements are then movable in particular by motor, e.g., hydraulically, pneumatically, electrically, and/or electromagnetically. For example, the measuring elements are then part of an actuator and in particular a linear motor, for example a hydraulic or pneumatic working cylinder. In particular, the measuring element connected to the scale unit is then formed as a piston rod actively retractable into and/or actively extendable out of a cylinder of the linear motor.

The present invention offers many advantages. The arrangement according to the invention of the magnetic bodies in combination with the magnetization thereof offers a significant advantage. The scale unit can thus be provided in a simply designed and particularly cost-effective manner. At the same time, a particularly high resolution is thus achieved for the detection of the measurement data about the relative movement of the attachment units. A further advantage is that such a scale unit only has a very small need for installation space and at the same time can generate such strong magnetic fields that they can be detected precisely and with uncomplicated sensor technology over comparatively greater distances and over components. Overall, the invention offers a significant improvement of the sensor system of, for example, controllable dampers or measuring units. The repelling arrangement has proven to be particularly advantageous for a high resolution and a reliable detection of the magnetic fields. The pre-tensioning unit also offers a special advantage. An undesired movement of the magnetic units is thus reliably counteracted, which could otherwise result in changes of the scale unit.

A radially magnetized magnetic body is understood in particular as a magnetic body in which the magnetic poles (north pole and south pole) are arranged coaxially to one another. In particular, the one magnetic pole coaxially encloses the other magnetic pole. In the scope of the present invention, the radially magnetized magnetic bodies can also be referred to as coaxially magnetized magnetic bodies.

The device can be used particularly advantageously and preferably as a vehicle component. The device is preferably designed as a vehicle component. Such a vehicle component comprises at least one sensor unit for detecting measurement data at least about a relative movement of at least two components moved or movable relative to one another. The sensor unit comprises at least one scale unit connectable or connected to one of the components. The sensor unit extends in a movement direction of the relative movement over at least one measuring section. The scale unit has at least one structure at least along the measuring section having magnetic bodies repeating in a defined (and in particular periodic) manner. In particular, the scale unit is provided by the magnetic bodies arranged in this way. The magnetic bodies are axially magnetized and are arrayed having identical magnetic poles along the measuring section, so that adjacent magnetic bodies repel (repelling arrangement) and/or the magnetic bodies are radially magnetized and are arrayed alternating with respect to their magnetic poles along the measuring section, in particular so that adjacent magnetic bodies attract at least with respect to their arrangement (attracting arrangement).

It is insofar possible in the scope of the present description to replace the term "device" with the term "vehicle component". The components are then in particular vehicle components. In particular, the measuring unit is suitable and designed for a use in a motor vehicle. It is also possible that the device comprises at least one vehicle component.

The vehicle component comprises in particular at least one drive unit and/or at least one transmission unit and/or at least one brake unit. The vehicle component can also comprise other units having components movable relative to one another, for example, a hatch or door unit. The respective unit in particular provides the at least two components movable relative to one another. The drive unit can comprise at least one internal combustion engine and/or at least one electrical machine (in particular an electrical traction motor). The vehicle component is provided in particular for a motor vehicle. In the scope of the present invention, both passenger vehicles and motorcycles and also utility vehicles or working machines and means of transport such as ships or aircraft or railways are understood as motor vehicles. The motor vehicle can be designed to be single-track or multi-track.

In particular, the receptacle unit comprises at least one piston rod or is formed as such. One of the attachment units, in particular the at least one attachment unit, preferably comprises at least one piston rod or is formed as such. It is also possible that one of the measuring elements comprises at least one piston rod or is formed as such. In particular, the piston rod is preferably part of a measuring unit and/or damper.

In one particularly advantageous embodiment, the magnetic bodies are at least partially arranged inside the receptacle unit and preferably the piston rod. In particular, the magnetic bodies are at least partially radially enclosed by the receptacle unit and preferably the piston rod. The magnetic bodies are preferably radially enclosed over the entire circumference by the receptacle unit and preferably the piston rod. In particular, the scale unit is arranged completely inside the receptacle unit and preferably the piston rod.

In particular, the receptacle unit and preferably the piston rod has at least one cavity and in particular at least one bore for the magnetic bodies. In particular, an internal diameter of the bore and an external diameter of the magnetic bodies have a fit with one another. In particular, the movement direction and/or the measuring section extend in the axial direction or longitudinal direction of the receptacle unit and preferably the piston rod. In particular, the measuring section and the receptacle unit and preferably the piston rod extend in parallel and in particular concentrically to one another. The one attachment unit can comprise at least one fastener for fastening (the receptacle unit and preferably the piston rod) to a component to be damped.

In particular, the other attachment unit of the two attachment units comprises at least one cylinder unit or is formed as such. In particular, the piston rod is retractable into and extendable out of the cylinder unit. The cylinder unit can comprise at least one damper housing or can be formed as such. The other attachment unit can comprise at least one fastener for fastening (the cylinder unit) to a component to be damped and/or to a support structure.

The receptacle unit and preferably the piston rod is preferably manufactured from a magnetically nonconductive material. The receptacle unit and preferably the piston rod is in particular suitable and designed to be permeated by the magnetic fields of the magnetic bodies in a defined manner. The magnetic bodies are in particular suitable and designed to permeate the receptacle unit and preferably the piston rod in a defined manner using their magnetic fields. A defined permeation is understood in particular to mean that an intended magnetic field can be detected and evaluated outside the receptacle unit and preferably the piston rod.

In particular, the sensor unit comprises at least one detector head. In particular, the detector head is used to detect the magnetic fields which originate from the magnetic bodies. It is preferred and advantageous that the detector head is arranged outside the receptacle unit and preferably the piston rod. Such an arrangement of the detector head offers many design advantages. A very high resolution is achieved using the invention and its magnetic bodies arranged inside the receptacle unit or piston rod even with such an arrangement of the detector head.

The detector head is in particular arranged spaced apart from the receptacle unit and preferably the piston rod. The detector head is preferably arranged adjacent to the scale unit. The detector head is particularly preferably arranged spaced apart from and adjacent to the scale unit. Contactless and wear-free detection is thus enabled.

The detector head is in particular arranged on the other attachment unit and preferably on the cylinder unit. In particular, the receptacle unit and preferably the piston rod and the detector head are movable relative to one another. In particular, the detector head comprises at least one sensor for detecting a magnetic field and preferably at least one Hall sensor or another suitable magnetic field sensor. The Hall sensor comprises in particular at least one Hall element and preferably at least two Hall elements. In advantageous embodiments, the Hall sensor comprises at least three or at least four Hall elements.

In one advantageous and preferred refinement, the radially magnetized magnetic bodies are provided by at least two different magnetic body types. In particular, at least one first magnetic body type and at least one second magnetic body type are comprised. In particular, the first magnetic body type has a magnetic north pole arranged on the radial inside and a magnetic south pole arranged on the radial outside. The second magnetic body type in particular has the magnetic north pole arranged on the radial outside and the magnetic south pole arranged on the radial inside. The first and second magnetic body types are preferably arrayed alternating along the measuring section. Using such magnetic body types, the scale unit can be implemented in a particularly uncomplicated manner and at the same time permits a particularly high measuring resolution. The radially magnetized magnetic bodies are preferably provided by only two different magnetic body types.

It is also advantageous and preferred that the axially magnetized magnetic bodies are provided by (only) one magnetic body type. In particular, the axially magnetized magnetic bodies are formed identically with respect to their orientation of the magnetic poles or of north pole and south pole. Adjacent axially magnetized magnetic bodies are preferably each arranged rotated by 180° along the measuring section. In particular, the axis of rotation is transverse to the axial direction of the magnetic bodies or transverse to the longitudinal direction of the damper here. Due to the use of only a single type of magnetic body, the scale unit can be produced particularly cost-effectively. At the same time, the turning of the magnetic bodies enables a particularly simple implementation of the repelling arrangement and thus a very advantageous measuring resolution.

In particular, the magnetic bodies are formed as disks or each comprise at least one such disk. In particular, the magnetic bodies are formed to be disklike. Such magnetic bodies can be produced particularly cost-effectively and integrated in an uncomplicated manner in the receptacle unit or piston rod. Such a disk in particular has a height which is greater than its external diameter or than its external radius or than its side length. In particular, the external diameter is at least twice and preferably at least three times greater than the height. The magnetic bodies are in particular cylindrical. The magnetic bodies can also have another suitable geometry.

The magnetic bodies are in particular formed at least partially circular in cross section. In particular, the magnetic bodies are at least partially circular disks. At least partially circular is understood here in particular to mean that a circular cross section is also included. Such an embodiment offers many advantages for housing the magnetic bodies and for orienting their magnetic fields. A circular disk is in particular a cylinder. A partially circular disk can also be referred to as a radial segment of a cylinder. The magnetic bodies are in particular round or have a round cross section or have a part of a round cross section. The magnetic bodies and in particular the disks can also comprise a different circumferential geometry, for example, quadrilaterals or polygons can be provided.

In particular, the radially magnetized magnetic bodies are formed as partially circular, preferably semicircular, disks. Such an embodiment is also possible for the axially magnetized magnetic bodies. It is preferred and advantageous that partially circular disks are provided in an angle of 135° to 225°. In particular, partially circular disks are provided in an angle range of 180°+/−10°.

It is advantageous and preferred that the axially magnetized magnetic bodies are formed as circular disks. It is also possible that the radially magnetized magnetic bodies are formed as circular disks.

The magnetic bodies preferably at least partially each have at least one through opening extending in the axial direction. In particular, the magnetic bodies are formed as at least partially circular perforated disks. This offers many advantages with respect to the production of the magnetic bodies and also for their arrangement in the receptacle unit or piston rod. Such magnetic bodies can also be referred to as hollow cylinders. The through opening is formed in particular as a bore. The through opening is in particular centrally arranged. The through opening can also be arranged off-center. The magnetic bodies can also have two or more through openings.

The radially magnetized magnetic bodies are preferably formed in an open ring shape. Such a magnetic body in particular corresponds to a partially circular and, for example, semicircular perforated disk. This offers a particularly inexpensive production even of very small and at the same time particularly powerful magnetic bodies. Particularly compact dampers can thus also be equipped therewith. Moreover, advantages thus result in the generation of the radial magnetization, since larger coils can be used for the magnetization even with very small magnetic bodies. A further advantage of such perforated disks is that a rotation of the receptacle unit and, for example, the piston rod in the angle range of the perforated disk can be compensated for or has no unfavorable influence on the measurement. The axially magnetized magnetic bodies can also be formed in this way.

The axially magnetized magnetic bodies are preferably formed in a closed ring shape. Such a magnetic body in particular corresponds to a circular perforated disk. This offers the advantage that a rotation of the scale unit or the receptacle unit/piston rod in relation to the detector head has no undesired influence on the detection of the relative movement. The magnetic field is preferably distributed essentially uniformly radially around the receptacle unit and in particular around the piston rod and in particular uniformly everywhere. This enables an advantageous embodiment in which it is possible to measure at any point (around the entire 360°). More options are thus obtained, for example, in the assembly and the design. A further advantage is that a rotation of the receptacle unit and, for example, the piston rod has no unfavorable influence on the measurement. Moreover, the closed ring shape does not represent increased effort for the axial magnetization. It is also advantageous that in such an embodiment all magnetic bodies have the same structure, thus the same parts are installed and are each assembled having identical poles toward one another. The sensor unit can thus be produced very cost-effectively. It is possible that the radially magnetized magnetic bodies are formed in a closed ring shape.

In all embodiments, it is particularly preferred that the sensor unit is suitable and designed for the purpose of generating at least one targeted magnetic field arrangement by means of the magnetic bodies. In particular, the scale unit comprises at least one targeted magnetic field arrangement. In particular, the magnetic field arrangement has periodically repeating magnetic properties.

In particular, the sensor unit is suitable and designed for the purpose of detecting the magnetic field arrangement by means of at least one detector head interacting with the scale unit and preferably detecting it outside the receptacle unit and preferably the piston rod. The detector head is in particular the above-described detector head. In particular, the sensor unit is suitable and designed for the purpose of ascertaining the relative movement of the one component or the one attachment unit relative to the other component or to the other attachment unit from the measurement data detected in this way. The relative movement can relate, for example, to a position and/or movement direction and/or velocity and/or a change over time of such parameters. This enables a reliable and at the same time uncomplicated detection of the magnetic field arrangement.

In particular, the sensor unit provides a resolution of at least 10 μm and preferably of at least 1 μm. In particular, the magnetic bodies have a height of at most 3 mm (+/−0.5 mm) and preferably at most 2 mm (+/−0.5 mm) for this purpose. Other heights adapted to the desired resolution are also possible.

In one advantageous refinement, the sensor unit has at least one pre-tensioning unit. In particular, the pre-tensioning unit is suitable and designed for the purpose of applying a pre-tensioning force in a targeted manner to the arrayed magnetic bodies to fix the magnetic bodies in a defined position (intended to be provided for the scale unit) in the event of bending of the receptacle unit and preferably the piston rod occurring in operation. This has the advantage that in the event of bending of the piston rod, no undesired change of the scale unit occurs. In particular, the pre-tensioning force is designed for the forces to be expected in operation or for the bending to be expected in operation of the receptacle unit and preferably the piston rod.

Alternatively or additionally, the magnetic bodies can also be fixed in their repelling arrangement by other clamping means and, for example, by screws. The magnetic bodies can also be pressed in and/or glued in. Such embodiments are provided in particular for the magnetic bodies arranged in a repelling manner. Such an embodiment can also be provided for the magnetic bodies arranged in an attracting manner.

The pre-tensioning unit is preferably suitable and designed for the purpose of pressing the axially magnetized magnetic bodies against one another as intended in their repelling arrangement. In particular, the pre-tensioning force at least corresponds to the repelling force of the magnetic bodies.

It is preferred and advantageous that a direction of the pre-tensioning force of the pre-tensioning unit is oriented opposite to a direction of the forces or shock forces to be damped by the damper. In addition to the above-described advantages, the rigidity of the overall system is significantly improved using such a pre-tensioning unit.

The pre-tensioning unit can be made at least partially elastic. The pre-tensioning unit comprises in particular at least one pre-tensioning spring arranged at least partially in the receptacle unit and preferably the piston rod. The magnetic bodies can be preloaded against at least one stop by means of the pre-tensioning spring. In particular, the stop is also arranged at least partially in the receptacle unit and preferably the piston rod. In particular, the pre-tensioning spring is designed for the forces to be expected in operation or for the bending of the receptacle unit and preferably the piston rod to be expected in operation. The pre-tensioning spring comprises in particular at least one elastic element and/or at least one gas spring. The pre-tensioning spring can comprise a traction spring and/or a compression spring.

The pre-tensioning unit can also comprise at least one essentially rigid pre-tensioning means. The pre-tensioning means is then in particular designed to be non-elastic. The pre-tensioning means comprises in particular at least one screw means and/or at least one wedge unit. The pre-tensioning means can consist, for example, of one or more screws which clamp the magnetic bodies with one another. The pre-tensioning means can comprise, for example, one or more wedges which are driven in at one end or at opposite ends of the receptacle unit. It is possible and advantageous that the sensor unit comprises at least one rotation lock. The rotation lock is suitable and designed in particular for the purpose of fixing the arrayed magnetic bodies in a rotation-locked manner in the receptacle unit and preferably the piston rod. Such an embodiment is particularly advantageous if magnetic bodies designed to be partially circular or in an open ring shape are used, since in this case a rotation could influence the measurement result. In particular, the rotation lock is used to block a rotation around an axis of rotation extending in the axial direction. In particular, the rotation lock is at least partially arranged in the receptacle unit and preferably the piston rod.

The piston rod is in particular connected to at least one damping piston. The damping piston divides the piston rod in particular into at least one first coupling rod section and at least one second coupling rod section. The coupling rod sections are in particular axially arrayed. In particular, the first coupling rod section is equipped with at least one fastener for fastening the damper. In particular, the magnetic bodies are (only) arranged in the second coupling rod section. This offers an advantageous housing of the sensor unit. The magnetic bodies can also be arranged in both coupling rod sections. It is also possible and advantageous that the magnetic bodies are only arranged in the first coupling rod section.

In particular, at least the first coupling rod section is extendable out of and retractable into the other attachment unit, in particular the cylinder unit. The second coupling rod section is preferably also retractable into and extendable out of the other attachment unit. The coupling rod sections can be formed separately or can be (integrally) connected to one another to form a continuous piston rod. The coupling rod sections can be connected to one another by the damping piston and/or via another component. A piston rod which only extends to one side of the damping piston can also be provided.

In particular, at least one damping valve having at least one damping channel is assigned to the damping piston. In particular, at least one magnetic field generating unit for generating and controlling a magnetic field in the damping channel is assigned to the damping piston. In particular, a magnetorheological medium is provided at least in the damping channel. In particular, the magnetorheological medium is also provided in the damper chambers. The invention offers particularly many advantages in combination with such a magnetorheological damper. In particular, the damper is designed as a magnetorheological damper. Other implementations of controllable damping valves are also possible.

The damper is preferably designed as a chassis damper. The chassis damper is particularly preferably designed as a steering damper and/or shock absorber. Other suitable constructions for dampers are also possible. In all embodiments, it is preferred that the damper is a linear damper. The damper can also be a rotational damper. For example, the damper can be designed like the damper described in patent application DE 10 2015 107 707 A1. The entire disclosure of DE 10 2015 107 707 A1 is hereby made part of the content of the disclosure of the present application.

The scale unit according to the invention is suitable and designed for use in the above-described device and in particular in the damper and/or the measuring unit. The scale unit according to the invention also particularly advantageously achieves the above-described object. The scale unit is designed here in particular as described above.

The magnetic bodies are designed in particular as permanent magnets or each comprise at least one such permanent magnet. The magnetic bodies are in particular permanently magnetized. The magnetic bodies can be arrayed spaced apart or touching for the scale unit. In particular, the axially magnetized magnetic bodies are arranged touching. However, their arrangement can also be spaced apart. The radially magnetized magnetic bodies are in particular arranged spaced apart. However, their arrangement can also be touching. In particular, the magnetic bodies are separately formed. In the operating assembled state, the magnetic bodies can also be connected to one another.

It is possible that at least one separating unit for preventing a magnetic short-circuit is arranged in each case between adjacent magnetic bodies, in particular between adjacent radially magnetized magnetic bodies. The separating unit is in particular manufactured from a magnetically nonconductive material or comprises at least one such material. The separating unit can be formed as an air gap. In particular, no separating units are provided between adjacent axially magnetized magnetic bodies.

In particular, the structure is formed as a regular periodic structure which has changing and periodically repeating magnetic properties. The scale unit has a structure and each period of the periodic structure forms a scale section or a sensor section of the sensor unit here.

The scale unit preferably has at least one regular periodic structure of changing magnetic and/or electrical properties. The individual periods of the periodic structure can have equal or also different spacings. It is thus possible, for example, that smaller (or larger) period spacings result toward one end.

It is possible and advantageous that the scale unit has at least two structures. The scale unit can also have at least three or four or more structures. (The) at least two structures are preferably formed differently. In particular, the at least two structures differ with respect to the dimensions of their magnetic bodies. In particular, the magnetic bodies of the at least two structures are formed having a different width and/or length and/or field strength and/or having a different diameter or partially or entirely consist of different materials.

Preferably, different lengths of the sensor sections (thus) deliberately result. In particular, the at least two structures (also) differ with respect to the length of their sensor sections. The sensor sections are preferably defined here by the dimensions of the magnetic bodies. In particular, the magnetic bodies of the structures are arranged at least in sections having an offset to one another. A higher resolution can be enabled, for example, in the vicinity of an endpoint by such embodiments. At least one structure along the measuring section can also have variable lengths of the sensor sections. Thus, for example, a recognition of the movement direction can take place. In particular, the detector head has at least one sensor for each of the structures.

It is possible that the magnetic bodies of a (first) structure are all formed having equal lengths. It is possible that the magnetic bodies of another (second) structure are also all formed having equal lengths. The lengths of the magnetic bodies of the first and second structures can be formed to be equal and in particular to have different lengths. It is also possible and preferred that the length of the magnetic bodies of one of the structures changes over the length of the structure and increases, for example, monotonously or in particular strictly monotonously.

In preferred embodiments, the scale unit has sensor sections, wherein preferably each sensor section corresponds to one period of the structure. In particular, the sensor sections are provided by the magnetic fields of the magnetic bodies. Preferably, at least one sensor section or essentially each or precisely each sensor section has a length in the movement direction of at least 0.25 mm. A sensor section is formed here in particular by a period of the periodic structure of the scale unit. The sensor section particularly preferably has a length in the movement direction of at least 0.5 mm and preferably at least 1 mm. A length of a sensor section of 2 mm, 3 mm, 4 mm, 5 mm, 6 mm, 8 mm, or 10 mm or more is also possible and preferred.

The measuring section of the scale unit in the movement direction particularly preferably corresponds at least essentially to a damper stroke. It is possible that the measuring section is somewhat shorter than a damper stroke. A length of the measuring section is preferably as long as a damper stroke and can also be somewhat greater. The measuring section can also be significantly longer than the damper stroke in the movement direction. For example, it is possible that during a linear movement of the damper unit, the measuring section extends in a zigzag shape or in a helical shape or in another curve shape in the movement direction, so that the curve length of the measuring section is significantly greater than the damper stroke.

In other preferred embodiments, the shock absorber operates rotationally, so that the two attachment units of the shock absorber are pivoted or rotated in relation to one another for the damping. It is then preferred that the measuring section extends on a curved path around the pivot axis or axis of rotation.

The detector head preferably has a plurality of detectors arranged offset in the movement direction. It is possible here that the detector signals of the individual detectors can be evaluated in such a way that overall, a sensor signal is output which has a higher resolution or higher accuracy. The one sensor signal can in turn consist of multiple channels or phases. The individual detectors of the detector head are preferably used to detect a relative position relative to the periodic structure of the scale unit. The resolution and the accuracy can be significantly increased by two offset detectors relative to the scale unit.

In particular, a signal strength of the individual detector signals can be evaluated to enable a determination of the position with a position resolution which is less than a length of a sensor section. In particular, the position resolution is more accurate than 0.1 mm, and preferably a position resolution of 50 μm or less than 10 μm is enabled. The position resolution can be more accurate than 5 μm or less than 2 μm here. Resolutions of 1 μm and better are also preferred.

Since the detector head interacts with the scale unit, a position of the shock absorber can be derived on the basis of the local physical or magnetic property of the scale unit from the intensity measured using the detector head. The measured intensity can be, for example, the field strength of an electrical or magnetic field. The magnetic properties of the structure can influence a magnetic field measured using the detector head or also an active electrical field strength. Measuring a capacitive variable or the like is also possible, which is influenced by the magnetic properties of the structure and the relative position of the detector head.

In particular, a ratio of a length of a sensor section to a position resolution of the determination of the position is greater than 100 and preferably the ratio is greater than 1000.

The signals of at least one detector can preferably be evaluated in the sensor unit in such a way that variables dependent on the position or movement of the shock absorber, such as absolute or relative position, velocity, direction, acceleration, or also jolt can be output via the interface.

In all embodiments, it is possible and preferred that the scale unit has at least one (additional) absolute position mark. The position mark can be designed, for example, as an end position sensor. The at least one position mark can also be embedded in the (periodic) structure of the scale unit. For example, in a magnetic periodic structure, a steady component of a field strength can change over the length of the scale unit, so that the local changes of the field strength for the position determination and a mean value of a field strength or the steady component over a period define the absolute position. The use of position marks via mechanical or capacitive switches (for example limit switches) or the like is also possible. In particular, the scale unit comprises a plurality of position marks.

The position mark can be provided by at least one of the magnetic bodies provided in the scale unit. Such a magnetic body can therefore also be referred to as a position mark magnetic body. The magnetic body in particular has an adapted field strength for this purpose. For example, the field strength is at least partially decreased or increased relative to the other or to the adjacent magnetic bodies of the scale unit. The absolute position can thus be detected on the basis of the targeted change of the field strength. For example, an increased or reduced magnetic field is present at a zero position.

Additionally or alternatively, the position mark can be provided by at least one magnetic element, which is provided in addition to the magnetic bodies arranged in the scale unit. In particular, at least one magnetic element is respectively provided for each (absolute) position mark. In particular, the magnetic element has a field strength which is at least partially decreased and/or increased relative to the magnetic bodies. Due to the targeted change of the field strength caused by the magnetic element, the absolute position and, for example, a zero position can then be reliably detected.

The position mark magnetic body and/or the magnetic element are in particular assigned to a defined (absolute) position in the scale unit. The defined (absolute) position is in particular a zero position. In particular, the sensor unit is suitable and designed for the purpose of detecting at least one signal of the position mark by means of the detector head and evaluating it to determine the absolute position. The above-described sensor and in particular the Hall sensor of the detector head is preferably used for this purpose. However, it is also possible that the detector head has at least one additional sensor for detecting the position mark.

The sensor unit can be suitable and designed for the purpose of determining a defined (absolute) position in the scale unit and preferably a zero position by traveling at least once along the measuring section (in the movement directions). This has the advantage, for example, that position marks can be omitted. In particular, the components are moved for this purpose starting from a starting point over the entire provided scale unit and/or measuring section. The length of the scale unit and/or measuring section is stored in the sensor unit in this case. In particular, for this purpose the entire length is traveled in both directions (thus negative and positive directions) using the detector head. This can be carried out, for example, by a movement of the components provided in any case in operation. When the entire length has been traveled (in both directions), the position of the starting point can be calculated from a positive offset and a negative offset. In particular, the positive and negative offset together result in the length. Knowing the starting point, at least one further defined (absolute) position and, for example, a zero position can then be ascertained. It can additionally be assumed that the position upon switching on would be the defined position and, for example, the zero point.

The sensor unit can be suitable and designed for the purpose of calculating a defined (absolute) position in the scale unit and preferably a zero position by an evaluation of a (time) curve of the relative movement. The sensor unit is preferably suitable and designed for the purpose of calculating a defined (absolute) position in the scale unit and preferably a zero position by an evaluation of experiential values and/or frequencies of the positions activated in operation. For example, a motorcycle will preferably accelerate on straight sections and on average will travel straight ahead more frequently than carrying out cornering. Right-hand and left-hand curves generally occur equally often on average. The zero point of a steering damper, for example, can then be calculated therefrom after a defined usage time.

The above-described steps enable an advantageous recognition of an absolute position or a zero position. This is helpful insofar as upon an activation of the device and, for example, upon turning on of a motor vehicle, the position of the detector head in relation to the measuring section is usually not known. The detector head could theoretically be located anywhere. This can be, for example, in the case of a steering damper in the motorcycle when the motorcycle is stationary and the handlebars are thus turned in one direction. Or a motor vehicle or bicycle, etc., is sunk deeper into the shock absorbers when a relatively heavy person is seated therein or thereon. In particular, at least one algorithm (for example software) for executing the above-described steps is stored in the sensor unit.

The device can comprise at least one spring unit for resetting and/or for pre-tensioning the attachment units. For example, a gas pressure spring and/or metal spring and/or elastomer spring or the like can be provided. At least one positive spring and/or at least one negative spring can be provided.

The device comprises in particular at least one control unit for activating the damper. The control unit is in particular operationally connected to the sensor unit. In particular, the control unit is suitable and designed for the purpose of activating the damper as a function of the detected measurement data. In particular, the sensor unit is suitable and designed for the purpose of receiving and/or evaluating the measurement data in real time. In particular, the control unit is suitable and designed for the purpose of activating the damper in real time. In particular, the damper is settable in real time.

In particular, at least one first damper chamber and at least one second damper chamber are provided by the cylinder unit. In particular, the first damper chamber and the second damper chamber are separated from one another by at least one damping piston. In particular, the damping piston is connected to the piston rod. In particular, at least one damping valve is assigned to the damping piston.

In particular, the first damper chamber and the second damper chamber are coupled to one another via at least one damping valve. In particular, at least one damping valve is preferably electrically controllable. Preferably, the first damper chamber and the second damper chamber are separated from one another by a damping piston, which is connected to a piston rod. The damping valve is preferably formed in the damping piston.

In one preferred refinement, at least one magnetic field generating unit is assigned to the or at least one damping valve, which is used to generate and control a magnetic field in at least one damping channel of the damping valve. The magnetorheological medium is then provided in the damping channel. At least one property of the shock absorber can be set via a controller of the damping valve and the damper unit can be controlled as a function of the measurement data of the sensor unit.

An adaptive damper having such a sensor unit for controllable damping also has the advantage in addition to the adaptivity that measurement data are created which can be processed by external units. Synergies can be used. For example, the data detection in vehicles. An adaptive chassis damper having a sensor unit continuously collects, for example, data about plunging position, load, velocity, and acceleration and thus obtains items of information about the load status of the vehicle, for example, whether the vehicle is overloaded or is loaded on one side, via the driving behavior of the driver and possible misbehavior. When cornering, for example, unfavorable loading can be concluded from different load of the dampers if excessively heavy objects are stored too high up, the vehicle tends to tilt when cornering.

The load or the load change can be concluded by the plunging depth. For example, when the vehicle is loaded or unloaded, it is measured how the weight changes.

The measurement accuracy of preferably <10 μm in real time permits vehicles having dampers and this sensor unit to also collect data about the underlying surface of the driving route, to conclude the load of the chassis, to document misuse (for example if a curb is scraped) or overloads are detected, etc.

Multiple chassis dampers can measure, for example, the vehicle orientation (horizontal or on a slope, spatial orientation sensor), since different stroke lengths occur when the vehicle is inclined.

The sensor unit and adaptive dampers can preferably be installed in all types of motor vehicles, but also in nonmotorized vehicles such as bicycles and cargo bicycles. In the case of cargo bicycles, it can also be advantageous to be able to conclude the load status. If a cargo bicycle is loaded on one side or too high, this can result in tipping over of the cargo bicycle when cornering. The controller of the damper or the sensor unit can then output information or a warning to the user. The damper characteristic curve can preferably additionally be adapted.

In the case of a steering damper, the vehicle can preferably process the items of information of the steering angle and only permit certain steering angles or output haptic feedback to the vehicle handlebars.

Artificial intelligence/machine learning preferably assists the controller of the dampers in the improvement or in the function. The controller analyzes, for example, the driving behavior and the driving routes and gives unloading and reloading proposals as a function of the wheel load. An app can inform the driver about the load status and output suggestions as to how the vehicle should/could be reloaded. In the case of multitrack and single-track motor vehicles, the controller preferably analyzes the load status and analyzes whether the vehicle can drive and park without hazard on an incline, especially in the case of single-track vehicles.

Overall, a magnetorheological fluid is preferably used as the magnetorheological medium. The magnetorheological medium can comprise a carrier medium. The carrier medium can be liquid or also gaseous in all embodiments. The carrier medium can be omitted (vacuum). It is possible that only particles that can be influenced by the magnetic field are filled in the damping channel, wherein possibly air or an inert gas is added. For example, if only air or also another gas is used, various solids can be mixed for this purpose to improve certain properties. For example, graphite powder can be admixed to reduce the friction between the carbonyl iron particles since graphite displays a lubricating effect. The particles can in particular be coated using PTFE. A coating using PTFE or a comparable coating in particular prevents the particles from clumping and forming larger heaps. Such larger heaps do not fall apart easily or under certain circumstances do not at all.

Further advantages and features of the present invention result from the exemplary embodiments, which are explained with reference to the appended figures.

DETAILED DESCRIPTION OF THE INVENTION

Figure 1:
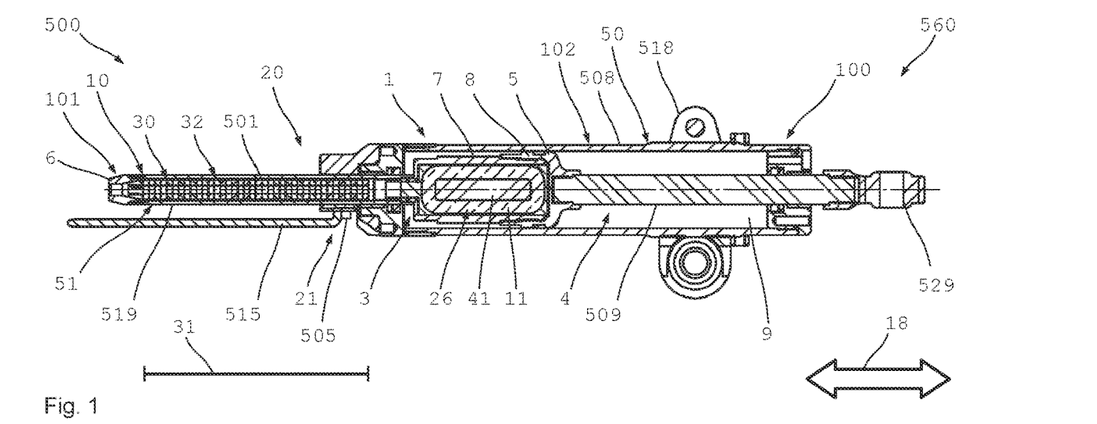
FIG. 1 shows a solely schematic illustration of a device according to the invention in a sectional side view.
Figure 3:
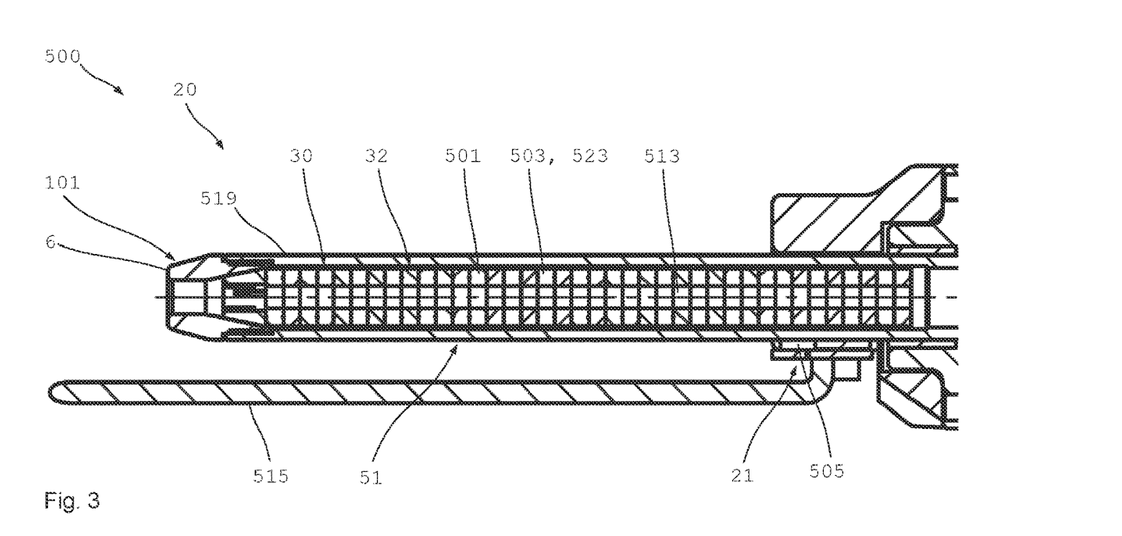
FIG. 3 shows a detail illustration of the device according to FIG. 1 in a sectional side view.
Figure 4:
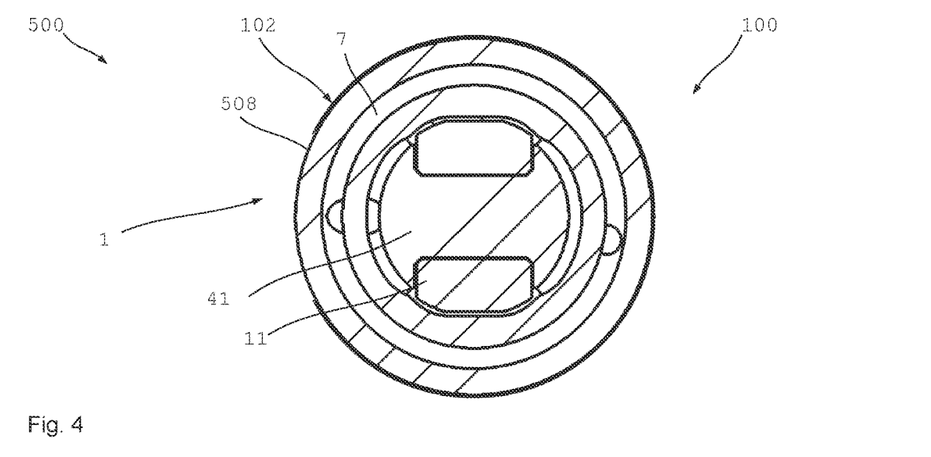
FIG. 4 shows a detail illustration of the device according to FIG. 1 in a sectional front view.

FIG. 1 shows a device 500 according to the invention having a damper 100, designed here as a linear damper. The device 500 is designed here, for example, as a vehicle component 560 of a motor vehicle. For this purpose, the damper 100 is, for example, a chassis damper 510. The device 500 is now described in more detail with reference to FIGS. 1 and 2 and the detail drawings of FIGS. 3 and 4.

Figure 2:
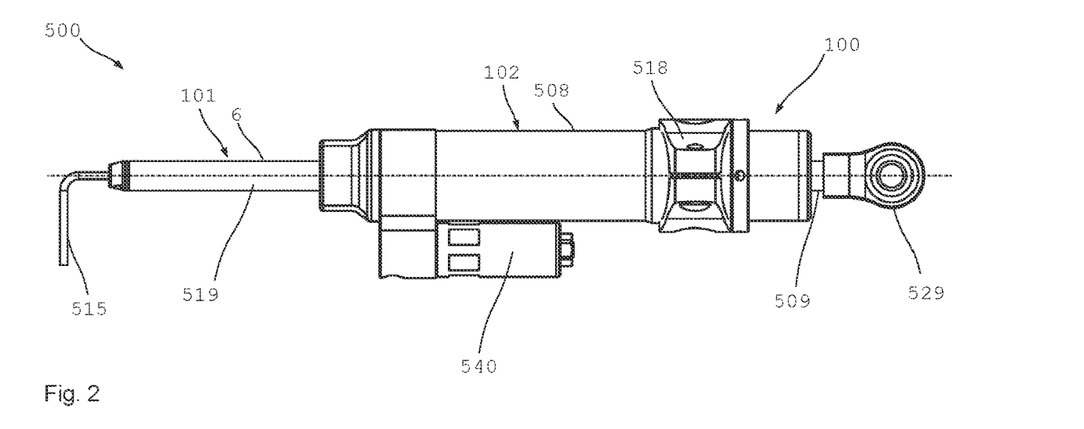
FIG. 2 shows the device according to FIG. 1 in a top view.

The damper 100 comprises two components 10, 50 movable relative to one another and designed as attachment units 101, 102. The attachment units 101, 102 are operationally connected here via a damper unit 1. The one attachment unit 101 is provided here by a piston rod 6. The other attachment unit 102 is provided here by a cylinder unit 508, which is also used here as a damper housing. The piston rod 6 can be moved along a movement direction 18 relative to the cylinder unit 508.

For fastening to the components to be damped, the piston rod 6 is equipped here with a fastener 529 and, for example, a hinge eye. The cylinder unit 508 is also equipped here with a fastener 518 and, for example, a hinge eye.

The damper unit 1 comprises two damper chambers 3, 4 here, which are arranged inside the cylinder unit 508. The damper chambers 3, 4 are separated from one another by a damping piston 5 fixedly connected to the piston rod 6. A damping valve 8 having one or more damping channels 7 is arranged between the damper chambers 3, 4. A magnetorheological medium or damping fluid 9 (MRF) is located here in the damping channels 7 and also the damper chambers 3, 4.

The MRF 9 can be influenced in a targeted manner by means of a magnetic field generating unit 26 to set the damper force. For this purpose, the magnetic field generating unit 26 has an electrical coil unit 11 having a core 41 here. A corresponding field strength can thus be generated using the magnetic field generating unit 26, the field lines of which enter the damping channels 7 and deliberately influence the MRF 9 therein ("magnetorheological damping valve 8"). The damper unit 1 can be seen particularly well in FIG. 4.

The piston rod 6 is divided here by the damping piston 5 into two coupling rod sections 509, 519. The one coupling rod section 509 is equipped here with the fastener 529, while the other coupling rod section 519 is equipped with a scale unit 30, described in more detail hereinafter, of a sensor unit 20.

To ensure a uniform function in variable environmental conditions or operating conditions, the damper 100 is equipped here with a compensation unit 540. Volume changes of the MRF 9 can thus be compensated for here, which are caused, for example, by temperature variations.

The damper 100 is equipped with a sensor unit 20 to detect the relative movements of the attachment units 101, 102. For example, the present position and the direction and/or velocity of the relative movements are monitored for this purpose using the sensor unit 20. Knowing these data, the damper unit 1 can then be activated, for example, by a control unit, not shown in greater detail here, to set a specific damper force as a function of the relative movement by means of the magnetic field generating unit 26.

The sensor unit 20 comprises a scale unit 30 connected to the attachment unit 101, which extends over a measuring section 31 in the movement direction 18 of the relative movement. The measuring section 31 corresponds here, for example, essentially to the provided damper stroke.

The scale unit 30 comprises here a structure 32 extending along the measuring section 31, over which the magnetic properties of the scale unit 30 change in a defined and in particular periodic manner.

To provide the structure 32, the scale unit 30 is equipped here with a plurality of magnetic bodies 501 arrayed in a targeted manner. The magnetic bodies 501 are permanent magnets here. The magnetic bodies 501 are arranged here inside a receptacle unit 51, which corresponds to the piston rod 6.

Figure 5:
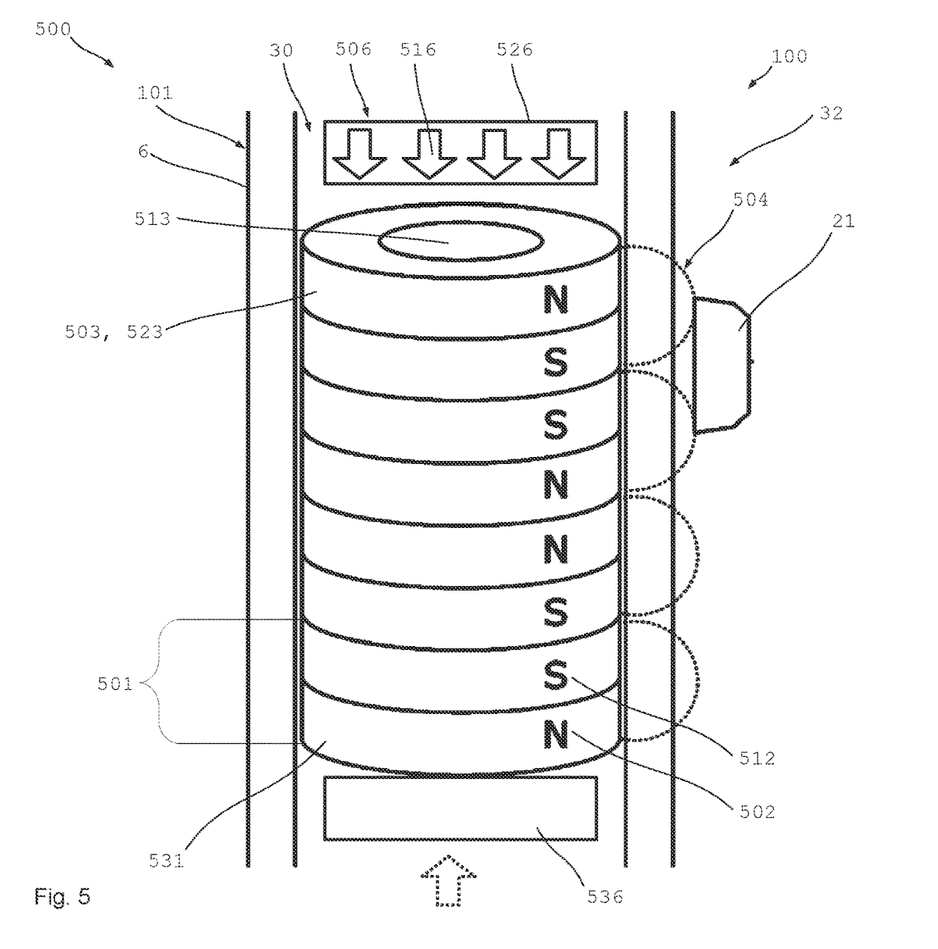
FIG. 5 shows a very schematic detail illustration of the device according to FIG. 1 in a partially sectional view.

In the embodiment shown here, the magnetic bodies 501 are axially magnetized. Moreover, the magnetic bodies 501, as presented in more detail hereinafter with reference to FIG. 5, are arrayed having identical magnetic poles 502, 512 along the measuring section 31. A repelling arrangement for adjacent magnetic bodies 501 thus results here.

The magnetic bodies 501 are equipped here as disks 503 each having a central through opening 513. The magnetic bodies 501 form round perforated disks 523 here. This enables a particularly uncomplicated and at the same time particularly precise integration of the magnetic bodies 501 into the piston rod 6. For example, the piston rod 6 is equipped for this purpose with a bore which is matched precisely fitted to the external diameter of the perforated disks 523. A further advantage of the perforated disks 521 is that a rotation of the magnetic bodies 501 in the piston rod 6 or a rotation of the piston rod 6 in relation to the detector head 21 has no negative effects on the measurement.

To detect the relative movements, the scale unit 30 is then read out in a contactless manner by means of a detector head 21. The detector head 21 detects for this purpose the changing magnetic properties of the scale unit 30 along the measuring section 31. The detector head 21 is arranged here on the other attachment unit 102 and spaced apart from the piston rod 6. So as not to unfavorably influence the magnetic fields, the piston rod 6 is manufactured here from a magnetically nonconductive material. The cylinder unit 508 is equipped here with a cable outlet 515 for electrically contacting the detector head 21.

The detector head has, for example, a Hall sensor 505 here. The Hall sensor 505 is equipped here with multiple and, for example, 4 Hall elements.

The magnetic fields of the magnetic bodies 501 thus have to pass through the material of the piston rod 6 here to be detected by the detector head 21 arranged outside the piston rod 6. The magnetic bodies 501 of the present invention represent a particularly uncomplicated and at the same time precise option for providing the corresponding powerful magnetic fields required for this purpose. At the same time, the magnetic bodies 501 also permit a particularly high resolution.

In FIG. 5, the scale unit 30 integrated in the piston rod 6 is shown very schematically and enlarged. The device 500 shown here is designed, for example, like the device 500 described above with reference to FIGS. 1-4.

The repelling arrangement of the axially magnetized magnetic bodies 501 can be seen well here. The magnetic bodies 501 all correspond here to an identical magnetic body type 531. Each magnetic body 501 has a magnetic north pole and a magnetic south pole 512 axially adjacent thereto in this case.

In the arraying of the magnetic bodies 501 shown here, the south pole 512 of a magnetic body 501 is adjoined by the south pole 512 of the respective axially adjacent magnetic body 501. Its north pole 502 is then in turn adjoined by the north pole 502 of the closest axially adjacent magnetic body 501. Adjacent magnetic bodies 501 are thus always aligned having the same magnetic poles 502, 512 toward one another, so that the repelling arrangement results.

A targeted and effective magnetic field arrangement 504 thus results, which passes through the material of the piston rod 6 and can be detected by the detector head 21 arranged spaced apart from the piston rod 6. Moreover, a particularly good signal-to-noise ratio results for the sensor system.

The device 500 is equipped here with a pre-tensioning unit 506, which applies a pre-tensioning force 516 to the arrayed magnetic bodies 501. In the event of a bend of the piston rod 6 occurring in operation, a displacement of the magnetic bodies 501 and thus an undesired change of the magnetic field arrangement 504 is thus counteracted.

For this purpose, for example, a pre-tensioning spring 526 is provided here, which pre-tensions the magnetic bodies 501 against a stop 536. The pre-tensioning force 516 has to be adapted to the operating conditions of the damper 100 to be expected, thus has to be able to apply at least as much force as is necessary to deflect the piston rod 6. Moreover, the magnetic bodies are pressed against one another here by means of the pre-tensioning unit 506 in spite of their repelling magnetic forces.

The pre-tensioning force 516 is oriented here so that it is directed against the forces to be damped by the damper. These forces are indicated here by a dashed block arrow. A movement of the magnetic bodies 501 relative to the piston rod 5 or the detector head 21 can thus be reliably prevented. Moreover, improved overall stability thus also results.

Figure 6:
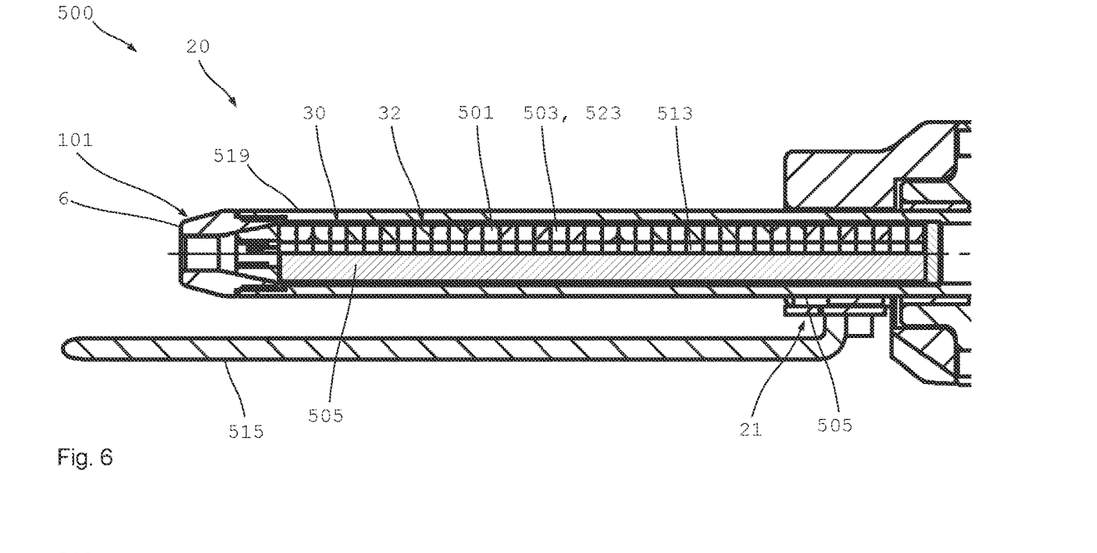
FIG. 6 shows a detail illustration of an embodiment of the device according to FIG. 1 in a sectional side view.
Figure 7:
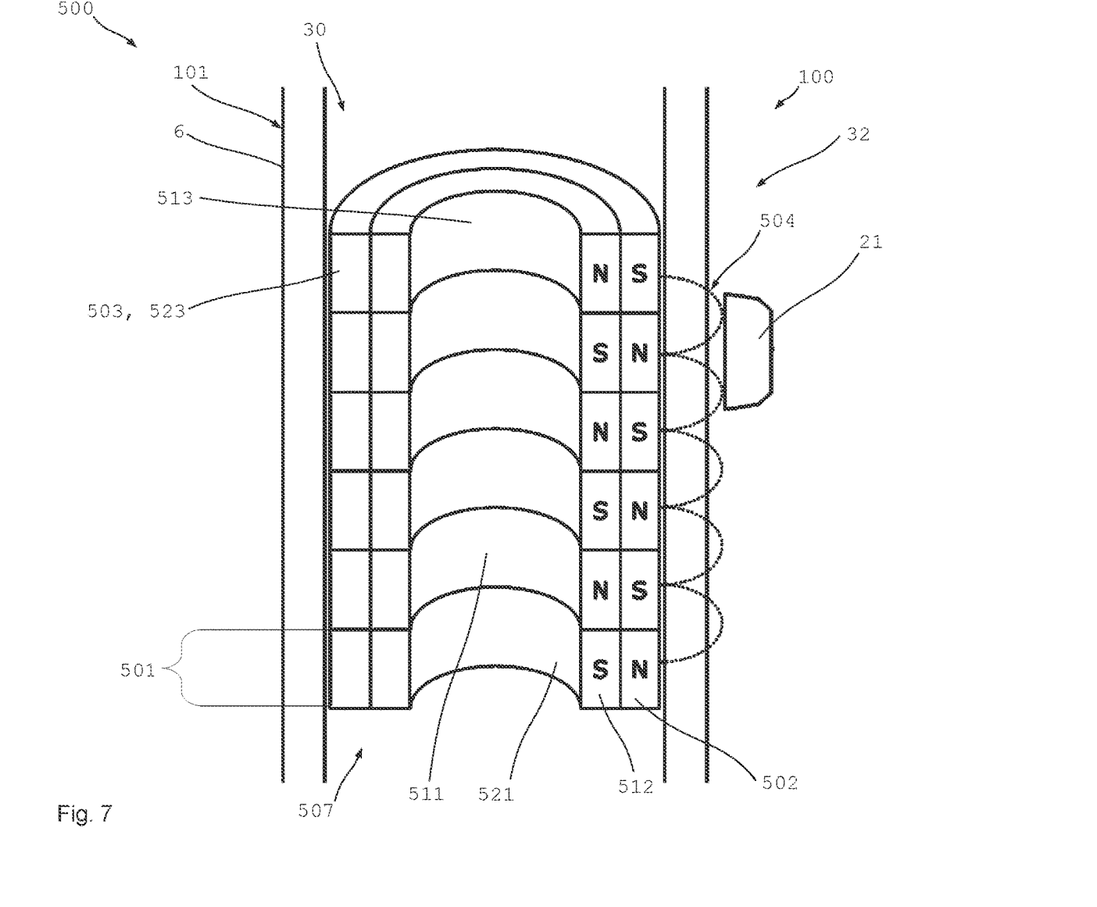
FIG. 7 shows a very schematic detail illustration of the device according to FIG. 6 in a partially sectional view.

An embodiment of the device 500 according to the invention is shown in FIGS. 6 and 7. In contrast to the above-described device 500, the magnetic bodies 501 are radially magnetized here and arrayed having their magnetic poles 502, 512 alternating along the measuring section 31. An attracting arrangement of the magnetic bodies 501 thus results.

Moreover, the magnetic bodies are formed here as semicircular disks 503 each having a through opening 513, so that perforated disks 523 result. Such semicircular perforated disks 523 or such an open ring shape of the magnetic bodies 501 offers the advantage that a coil used for the radial magnetizing can be guided better in the center of the magnetic bodies 501. This is advantageous especially in the case of very small dimensions of the damper 100.

To block an undesired rotation of the magnetic bodies 501 in the piston rod 6, a rotation lock 507 is provided here. This extends, for example, in the bore of the piston rod 6 provided for the magnetic bodies 501. The rotation lock 507 is secured here therein so that a rotational movement of the magnetic bodies 501 is blocked in a formfitting and/or friction-locked manner.

The attracting arrangement of the radially magnetized magnetic bodies 501 can be seen particularly well in FIG. 7. The structure 32 of the scale unit 30 described here is formed by two different magnetic body types 511, 521. The first magnetic body type 511 has the magnetic north pole 502 on the radial inside and the magnetic south pole 512 on the radial outside. In the other magnetic body type 521, it is precisely the reverse, so that the magnetic south pole 512 is arranged on the radial inside and the magnetic north pole 502 on the radial outside.

These two magnetic body types 511, 521 are arrayed alternating here. The array shown here thus results, in which a radially internal north pole 502 of the adjacent magnetic body 501 follows a radially internal south pole 512 in each case. Accordingly, the radially external south pole 512 of the adjacent magnetic body 501 follows a radially external north pole 502 in each case.

The detection of the magnetic field arrangement 504 is also carried out here as described above by means of the detector head 21.

Figure 8:
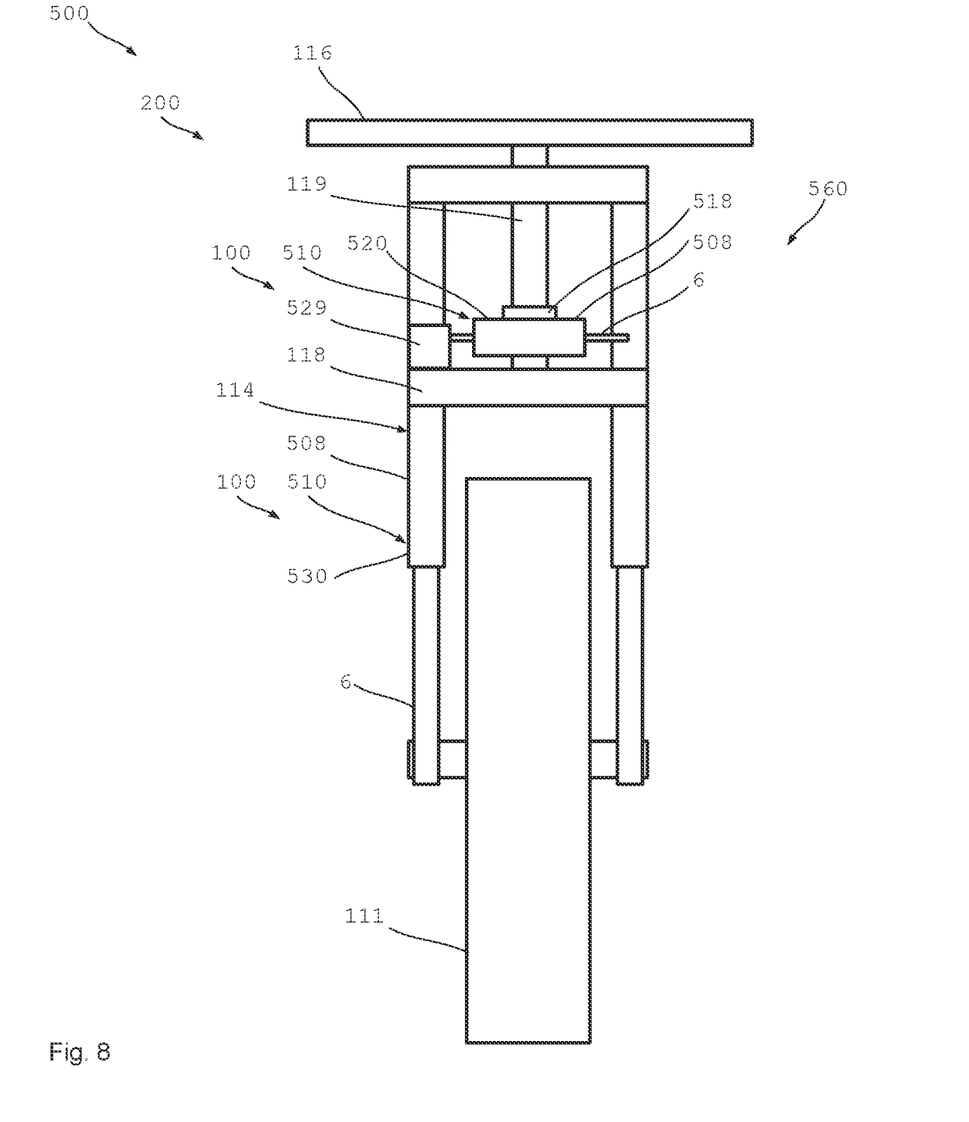
FIG. 8 shows a solely schematic illustration of a bicycle having a device according to the invention in a front view.

FIG. 8 shows a two-wheeled vehicle 200 designed as a motorcycle. The front wheel 111 is supported here by a suspension fork 114 having two triple clamps 118 and a fork shaft 119. Handlebars 116 are arranged on the fork shaft 119.

The two-wheeled vehicle 200 is equipped here with a device 500 according to the invention for damping the steering movement, in which the damper 100 is designed as a chassis damper 510 and specifically here as a steering damper 520. For this purpose, the piston rod 6 is fastened using the fastener 529 on the triple clamp 118. The cylinder unit 508 is fastened using its fastener 518 on the fork shaft 119.

In the case of a steering movement, a relative movement thus occurs between the piston rod 6 and the cylinder unit 508, so that the steering movement can be damped by the damper unit 1. To activate the steering damper 520 deliberately, it is equipped with a sensor unit 20, as was described with reference to the preceding figures.

Additionally or alternatively to the steering damper 520, the two-wheeled vehicle 200 can also be equipped here with a chassis damper 510 designed as a shock absorber 530. The shock absorber 530 is then part of the suspension fork 114. The piston rod 6 then provides, for example, a dip tube of the suspension fork 114 in each case. The cylinder unit 508 then provides a stand tube of the suspension fork 114 in each case. The two-wheeled vehicle 200 can thus absorb irregularities when driving using the device 500. To activate the shock absorber 530 deliberately, it is equipped with a sensor unit 20, as was described with reference to the preceding figures.

Figure 9:
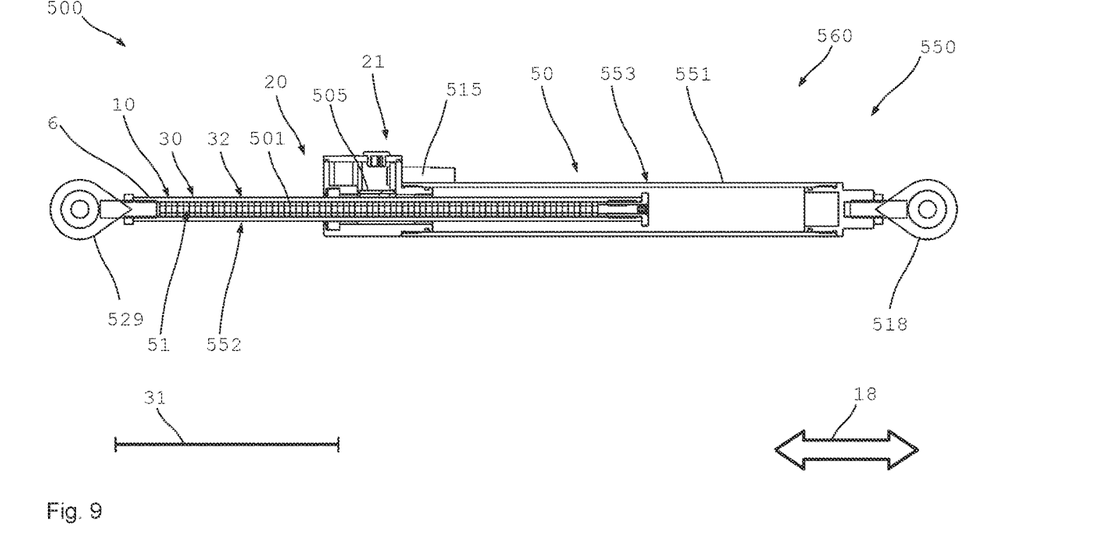
FIG. 9 shows a solely schematic illustration of another device according to the invention in a sectional side view.

FIG. 9 shows a device 500 according to the invention having a measuring unit 550. The device 500 is also described in more detail hereinafter with reference to the detailed drawing of FIG. 10. Such a device 500 can be used particularly advantageously as a vehicle component 560 in a motor vehicle.

Figure 10:
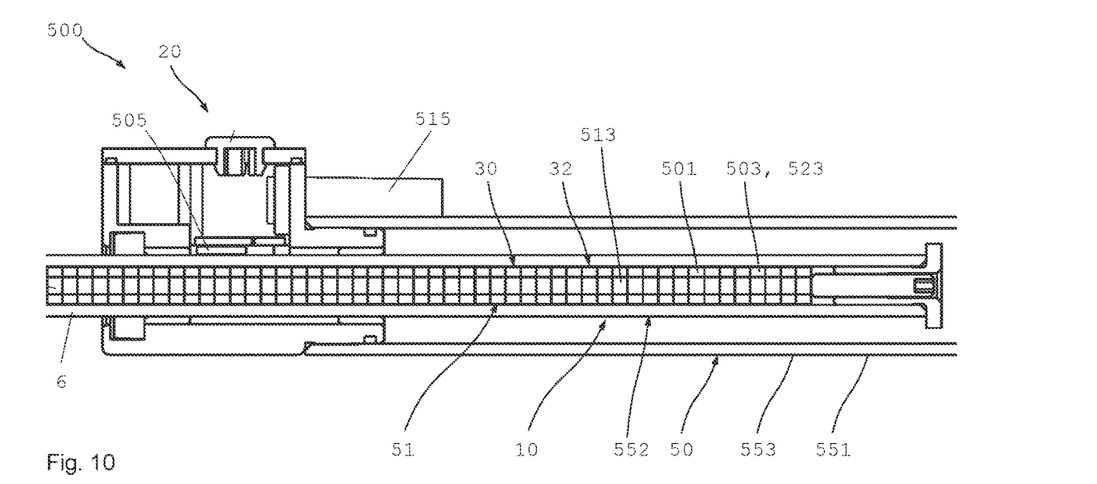
FIG. 10 shows a detail illustration of the device according to FIG. 9 in a sectional side view.

The measuring unit 550 comprises here two measuring elements 552, 553 movable relative to one another. One measuring element 552 is designed as a piston rod 6 and the other measuring element 553 is designed as a cylinder 551. The piston rod 6 can be extended out of and retracted into the cylinder 551. The extension and retraction takes place passively by way of a movement of components (not shown here), which are each mechanically coupled on one measuring element 552, 553. Measurement data about the movement of the components can thus be detected using the measuring unit 550. The measuring elements 552, 553 correspond here to the components 10, 50.

The piston rod 6 forms the receptacle unit 51 for the magnetic bodies 501 here. The sensor unit 20 is designed here as was described above for the damper 100. The same reference signs as in the preceding figures have been used for the same parts or parts functioning in the same manner.

Figure 11:
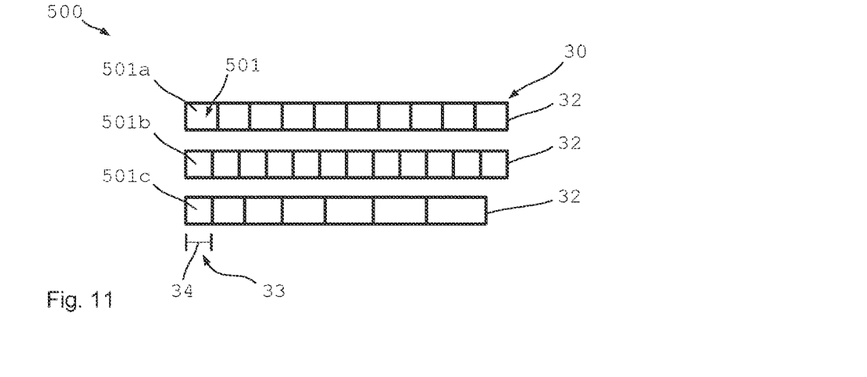
FIG. 11 shows a schematic illustration of a scale unit having different structures.

A device 500 according to the invention is shown very schematically in FIG. 11, the scale unit 30 of which has multiple structures 32 here. The device 500 can have, for example, two of the three depicted structures 32. It is also possible that the device 500 comprises all three structures 32. The structures 32 each differ here with respect to the magnetic bodies 501 thereof. The upper structure 32 has magnetic bodies 501a which are formed larger (for example wider and/or longer) than the magnetic bodies 501b of the middle structure 32. The lower structure 32 is equipped with magnetic bodies 501c, the size of which changes and, for example, increases here along the measuring section 31. Different lengths 34 of the sensor sections 33 result in a targeted manner due to the different magnetic bodies 501a-c. It can also be said that a deliberately different period dimension for structures 32 thus results. The scale unit 30 can also have two identical structures 32 or also only two of the three structures 32 shown here.

It is to be noted here that in all designs and exemplary embodiments, the structure 32 of the scale unit 30 does not necessarily have to have equal lengths 34 of the sensor sections 33 over its entire length. It is also possible that a part of the sensor sections 33 has shorter (or longer) sensor sections 33, for example, in one section. It is also possible that each individual sensor section 33 has a different length 34. Different lengths 34 of the sensor sections 33 can be reasonable, for example, to automatically effectuate a higher resolution in the vicinity of an endpoint. Vice versa, a greater spacing or a greater length 34 of a sensor section 33 can be provided in other regions to make the sensor unit 20 less sensitive there. Lengths 34 of the sensor sections 33 which are variable over the measuring section 31 enable, for example, a reliable recognition of the movement direction.

The embodiment shown here provides designing the scale unit 30 in such a way that three or more (or also only two) parallel structures 32 extend in the movement direction 18, which act as individual scales. The structures 32 can therefore also be referred to as scales of the scale unit 30. Individual scales do not have to act uniformly over the entire movement length, for example, at the ends upon use as an index. The detector head 21 is then designed accordingly and has at least one additional sensor for each of the structures 32.

The position of the detector head 21 can also be absolutely determined by using two or more structures 32 in the scale unit 30: either by digital coding or also two paths having lengths of the respective sensor sections 33 different from one another, similarly to the vernier scale in calipers.

LIST OF REFERENCE SIGNS 1 damper unit
3 first damper chamber
4 second damper chamber
5 damping piston
6 piston rod
7 damping channel, flow channel
8 damping valve
9 MRF
10 component
11 electrical coil unit
18 movement direction position
20 sensor unit
21 detector head
26 magnetic field generating unit
30 scale unit
31 measuring section
32 structure
33 sensor section
34 length
41 core
50 component
51 receptacle unit
100 damper
101, 102 attachment unit
111 wheel, front wheel
114 suspension fork
116 handlebars
118 triple clamp
119 fork shaft
200 two-wheeled vehicle
500 device
501 magnetic body
501a magnetic body
501b magnetic body
501c magnetic body
502 magnetic pole (north)
503 disk
504 magnetic field arrangement
505 Hall sensor
506 pre-tensioning unit
507 rotation lock
508 cylinder unit
509 coupling rod section
510 chassis damper
511 magnetic body type
512 magnetic pole (south)

513 through opening
515 cable outlet
516 pre-tensioning force
518 fastener
519 coupling rod section
520 steering damper
521 magnetic body type
523 perforated disk
526 pre-tensioning spring
529 fastener
530 shock absorber
531 magnetic body type
536 stop
540 compensation unit
550 measuring unit
551 cylinder
552 measuring element
553 measuring element
560 vehicle component

The invention claimed is:

1. A device with at least one sensor unit for detecting measurement data about a relative movement of two components that are movable relative to one another, the sensor unit comprising:
a scale unit connectable to one of the components and extending in a movement direction of a relative movement over a measuring section;
said scale unit having a structure with a plurality of arrayed magnetic bodies that repeat in a defined manner along said measuring section;
wherein:
said magnetic bodies are axially magnetized and said radially magnetized magnetic bodies are at least two different magnetic body types, including a first magnetic body type with a magnetic north pole arranged on a radially inner side and a magnetic south pole arranged on a radially outer side, and including a second magnetic body type with a magnetic north pole arranged on a radially outer side and a magnetic south pole arranged on a radially inner side, and wherein said first and second magnetic body types are arranged in alternation along said measuring section; and
at least one pre-tensioning unit configured to fix said arrayed magnetic bodies using a pre-tensioning force.

2. The device according to claim 1, wherein said sensor unit comprises at least one receptacle for receiving said structure with said arrayed magnetic bodies.

3. The device according to claim 2, wherein said pre-tensioning unit is configured for applying the pre-tensioning force in a targeted manner to said arrayed magnetic bodies to fix said magnetic bodies in a defined position in an event that said receptacle unit is bent during operation.

4. The device according to claim 2, wherein said pre-tensioning unit comprises at least one pre-tensioning spring disposed at least partially in said receptacle unit and configured to bias said magnetic bodies against at least one stop.

5. The device according to claim 2, wherein the one component to which said scale unit is connectable is a piston rod or is formed to provide said receptacle unit, at least in part, and said magnetic bodies are arranged inside said piston rod.

6. The device according to claim 2, wherein said receptacle unit is manufactured from a magnetically nonconductive material.

7. The device according to claim 2, wherein said sensor unit comprises a detector head arranged outside said receptacle unit.

8. The device according to claim 2, wherein said sensor unit comprises a rotation lock configured to fix said arrayed magnetic bodies against a rotation in said receptacle unit.

9. The device according to claim 1, wherein said radially magnetized magnetic bodies are at least partially circular disks and/or wherein said axially magnetized magnetic bodies are circular disks.

10. The device according to claim 1, wherein said magnetic bodies are formed with a through opening extending in an axial direction.

11. The device according to claim 1, wherein said radially magnetized magnetic bodies are open rings and/or wherein said axially magnetized magnetic bodies are closed rings.

12. The device according to claim 1, wherein said magnetic bodies are configured to generate a targeted magnetic field and said sensor unit is configured to detect the magnetic field by way of at least one detector head interacting with said scale unit and to ascertain therefrom at least one of a position of at least one of the components or a movement direction of at least one of the components or a velocity of a relative movement of the components.

13. The device according to claim 12, wherein said detector head comprises a Hall sensor.

14. The device according to claim 1, wherein said sensor unit is configured to provide a measuring resolution of at least 10 μm and wherein said magnetic bodies have a height of at most 3 mm.

15. The device according to claim 1, wherein said scale unit comprises at least two structures and wherein said at least two structures are formed differently and differ with regard to dimensions of the respective said magnetic bodies.

16. The device according to claim 1, wherein said scale unit includes at least one absolute position mark provided by at least one of said magnetic bodies of said scale unit, with said one magnetic body having an adapted field strength.

17. The device according to claim 1, wherein said sensor unit is configured for determining a defined position in said scale unit by traveling along said measuring section at least once.

18. The device according to claim 1, wherein said sensor unit is configured for calculating a defined position in said scale unit by way of evaluating a time curve of the relative movement.

19. The device according to claim 1, comprising a controllable damper having two attachment units that are movable relative to one another and are operationally connected via at least one damper unit for damping shocks, wherein said sensor unit is configured for detecting measurement data about a relative movement of said attachment units in relation to one another and wherein said scale unit is connected to one of said attachment units of said damper and wherein one of the attachment units at least partially provides a receptacle unit for receiving said structure with said arrayed magnetic bodies.

20. The device according to claim 19, wherein said pre-tensioning unit is disposed to provide a pre-tensioning force with a direction that is oriented against a direction of forces to be damped by the damper.

21. The device according to claim 19, wherein said piston rod is connected to at least one damping piston and wherein said damping piston divides said piston rod into a first coupling rod section and a second coupling rod section disposed axially behind said first coupling rod section, and wherein said first coupling rod section is equipped with a fastener for fastening said damper and wherein said magnetic bodies are arranged in said second coupling rod section.

22. The device according to claim 19, further comprising at least one damping valve assigned to said damping piston, said damping valve having at least one damping channel and a magnetorheological medium in said damping channel, and a magnetic field generating unit for generating and controlling a magnetic field in said damping channel.

23. A device, comprising:
- a sensor unit for detecting measurement data about a relative movement of two components disposed to move relative to one another;
- said sensor unit having at least one scale unit connectable to one of the components and extending in a movement direction of a relative movement over at least one measuring section; and
- said at least one scale unit having a structure with a plurality of radially magnetized magnetic bodies repeating in a defined manner along said measuring section; and
- wherein said radially magnetized magnetic bodies are at least two different magnetic body types, including a first magnetic body type with a magnetic north pole arranged on a radially inner side and a magnetic south pole arranged on a radially outer side, and including a second magnetic body type with a magnetic north pole arranged on a radially outer side and a magnetic south pole arranged on a radially inner side, and wherein said first and second magnetic body types are arranged in alternation along said measuring section.

* * * * *